(12) United States Patent
Takata et al.

(10) Patent No.: US 12,434,071 B2
(45) Date of Patent: Oct. 7, 2025

(54) LIGHT IRRADIATION MEDICAL DEVICE

(71) Applicant: KANEKA CORPORATION, Osaka (JP)

(72) Inventors: Hironori Takata, Settsu (JP); Toshihiko Uto, Settsu (JP)

(73) Assignee: KANEKA CORPORATION, Osaka (JP)

( * ) Notice: Subject to any disclaimer, the term of this patent is extended or adjusted under 35 U.S.C. 154(b) by 298 days.

(21) Appl. No.: 18/033,172

(22) PCT Filed: Oct. 21, 2021

(86) PCT No.: PCT/JP2021/038881
§ 371 (c)(1),
(2) Date: Apr. 21, 2023

(87) PCT Pub. No.: WO2022/123920
PCT Pub. Date: Jun. 16, 2022

(65) Prior Publication Data
US 2023/0390576 A1 Dec. 7, 2023

(30) Foreign Application Priority Data
Dec. 9, 2020 (JP) ................ 2020-204324

(51) Int. Cl.
*A61N 5/06* (2006.01)
(52) U.S. Cl.
CPC ........... *A61N 5/062* (2013.01); *A61N 5/0603* (2013.01); *A61N 2005/0602* (2013.01); *A61N 2005/063* (2013.01); *A61N 2005/0665* (2013.01)

(58) Field of Classification Search
None
See application file for complete search history.

(56) References Cited

U.S. PATENT DOCUMENTS 6,598,993 B1 * 7/2003 Dalton ................. F21V 14/045
362/202
2014/0235942 A1 * 8/2014 Hellstrom ............ A61B 1/0615
128/200.26

(Continued)

FOREIGN PATENT DOCUMENTS

DE 3833990 C2 * 5/1995 ............. A61B 18/24
JP 2008-125939 A 6/2008
(Continued)

OTHER PUBLICATIONS

Translation of DE 3833990 (Year: 1995).*
(Continued)

*Primary Examiner* — James M Kish
(74) *Attorney, Agent, or Firm* — Birch, Stewart, Kolasch & Birch, LLP

(57) ABSTRACT

A light irradiation medical device comprising: a shaft having a lumen extending in the longitudinal direction; and a light guiding device that is disposed in the lumen of the shaft and is movable in the longitudinal direction. The light guiding device extends in the longitudinal direction and has a light diffusion part at a distal part of the light guiding device. The shaft has: a first window in a peripheral wall of a distal part of the shaft; and a second window at a distal end face of the shaft. The shaft has a reflection surface inside the shaft and at a distal side with respect to the first window, and reflects light emitted from the light guiding device.

14 Claims, 12 Drawing Sheets

(56) References Cited

U.S. PATENT DOCUMENTS

2015/0062882 A1* 3/2015 Hsu ..................... F21L 4/027
362/183
2022/0225880 A1* 7/2022 Mueller ............ A61B 5/02007

FOREIGN PATENT DOCUMENTS

JP      2014-104138 A      6/2014
WO   WO-2016205576 A1 * 12/2016   ........... A61B 5/0066

OTHER PUBLICATIONS

International Search Report (PCT/ISA/210) issued in PCT/JP2021/038881, dated Jan. 11, 2022.
Written Opinion of the International Searching Authority (PCT/ISA/237) issued in PCT/JP2021/038881, dated Jan. 11, 2022.

* cited by examiner

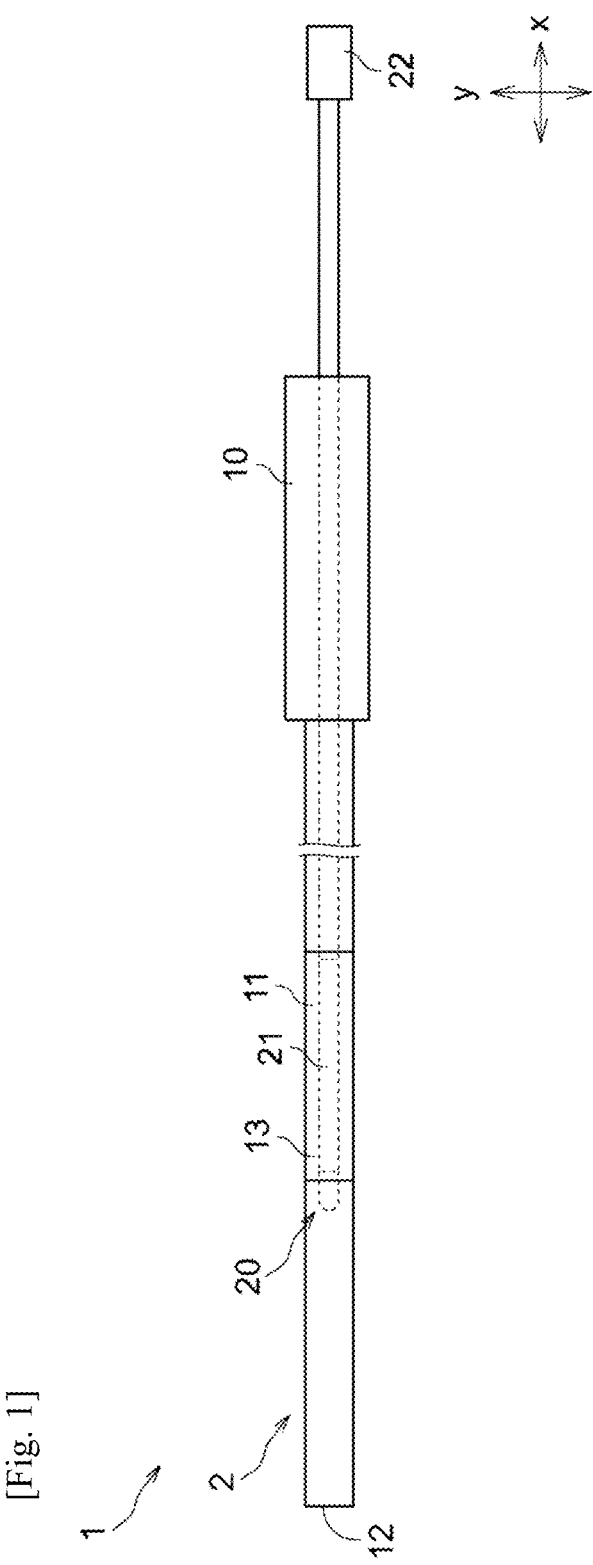

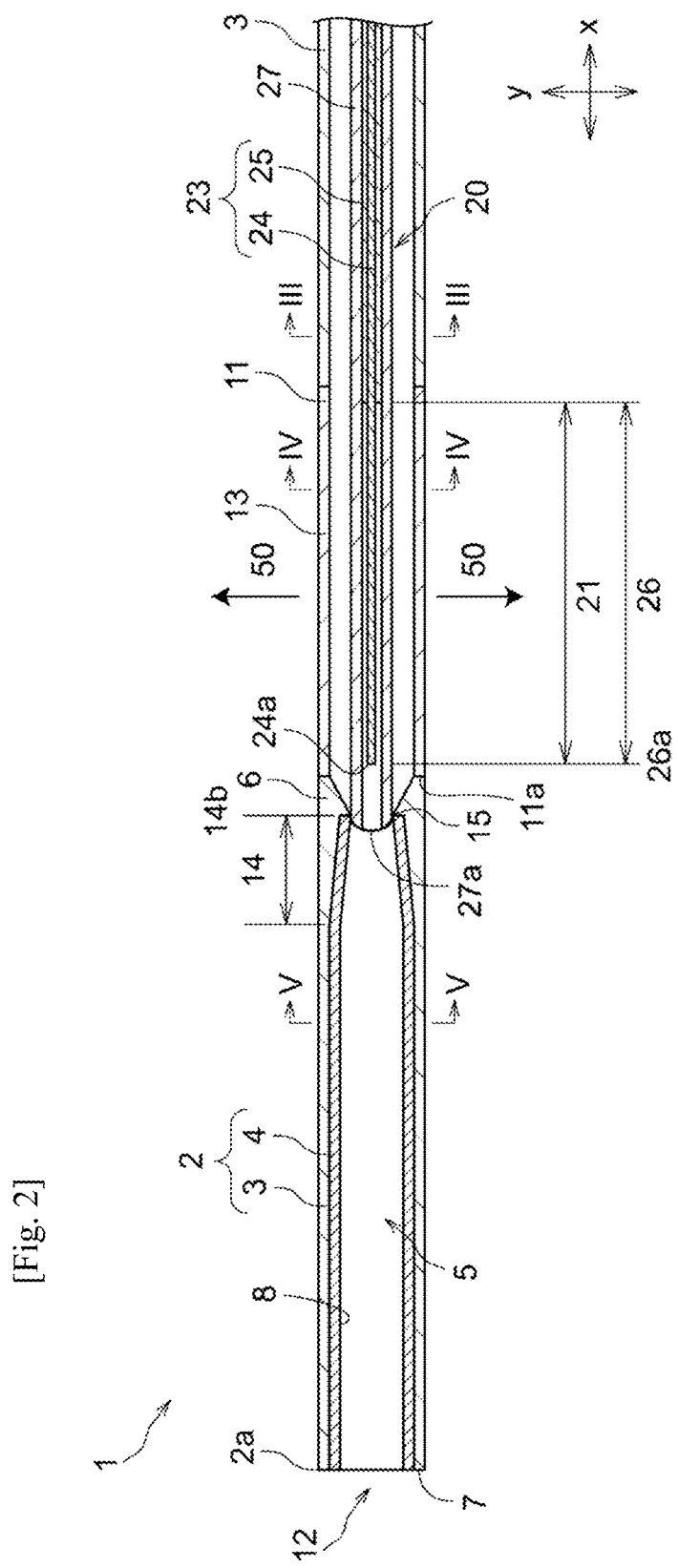
[Fig. 2]

[Fig. 3]
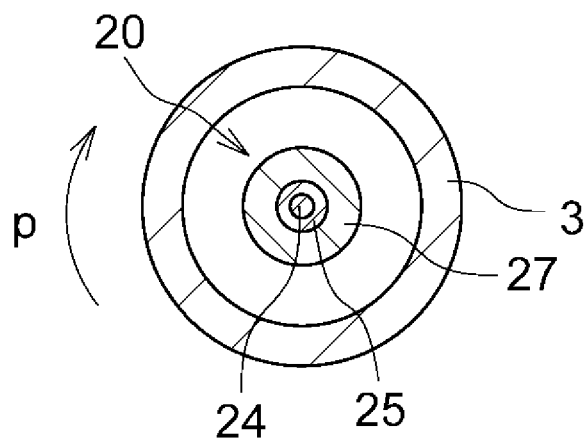
[Fig. 4]
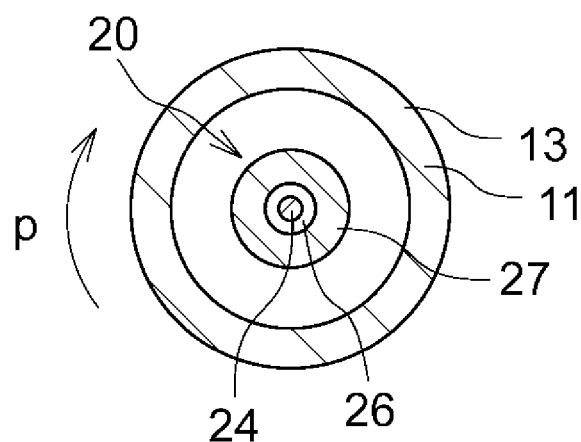
[Fig. 5]
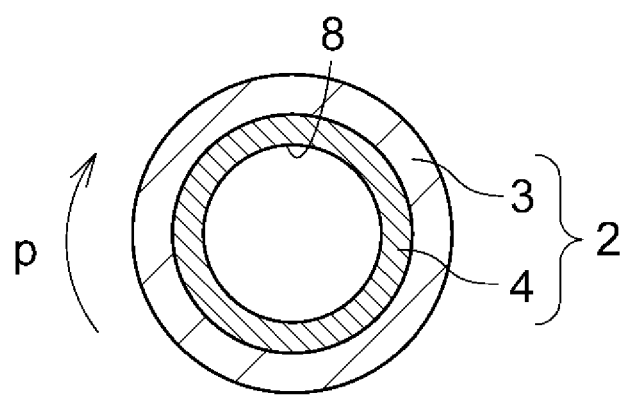

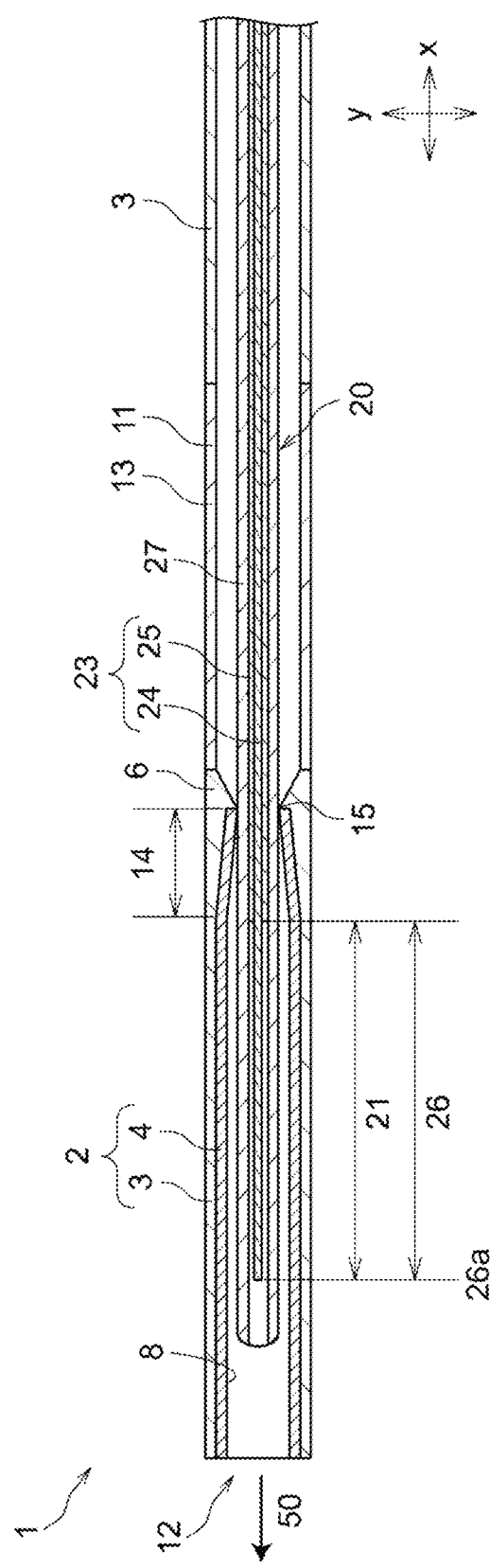
[Fig. 6]

[Fig. 7]
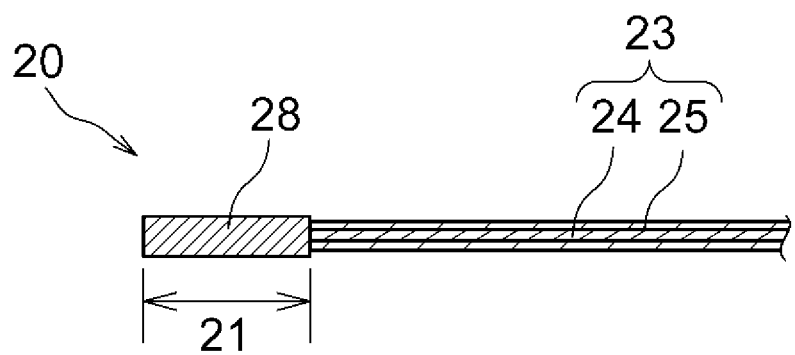

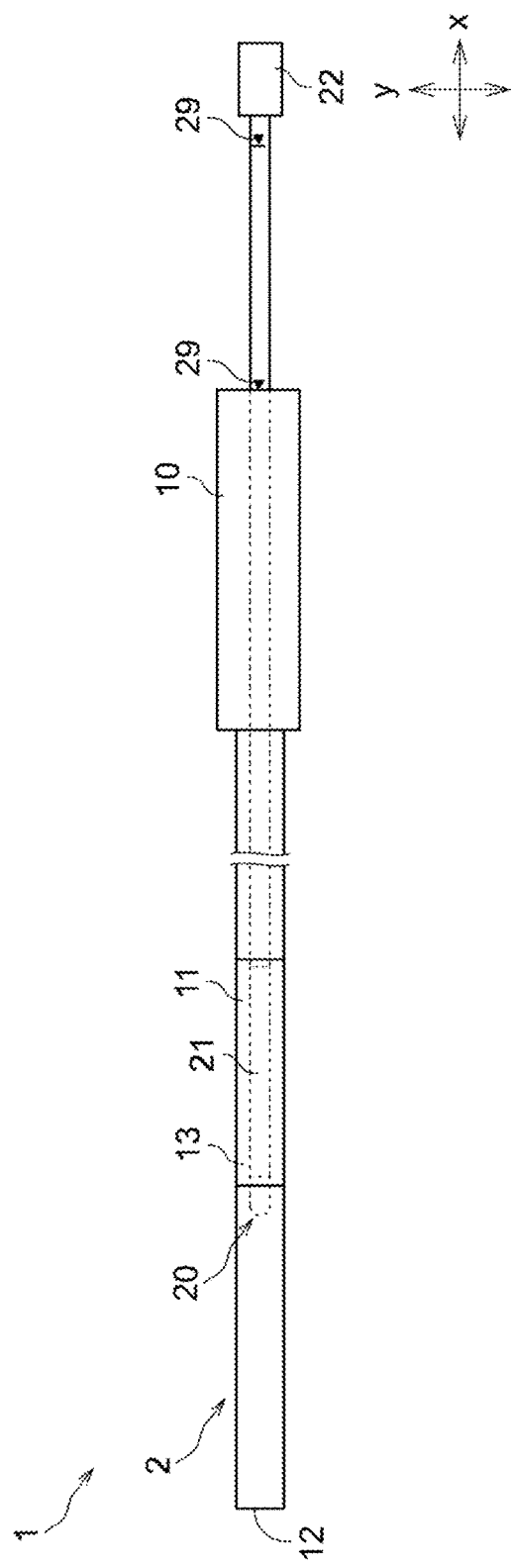
[Fig. 8]

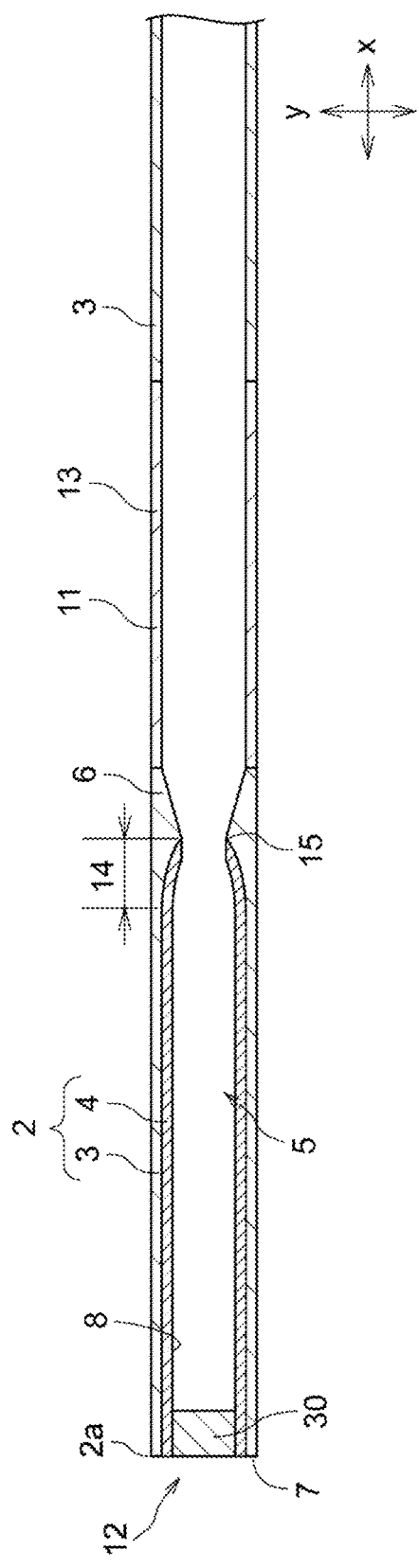

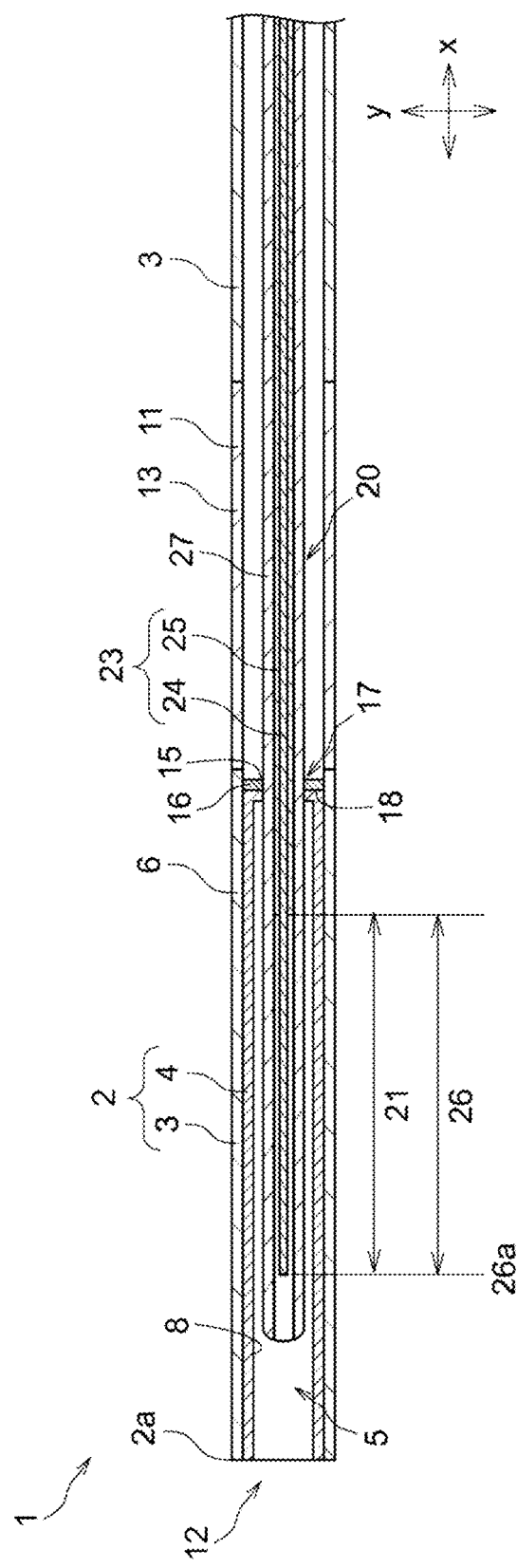

[Fig. 11]
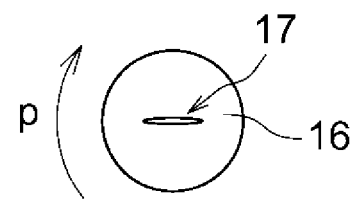

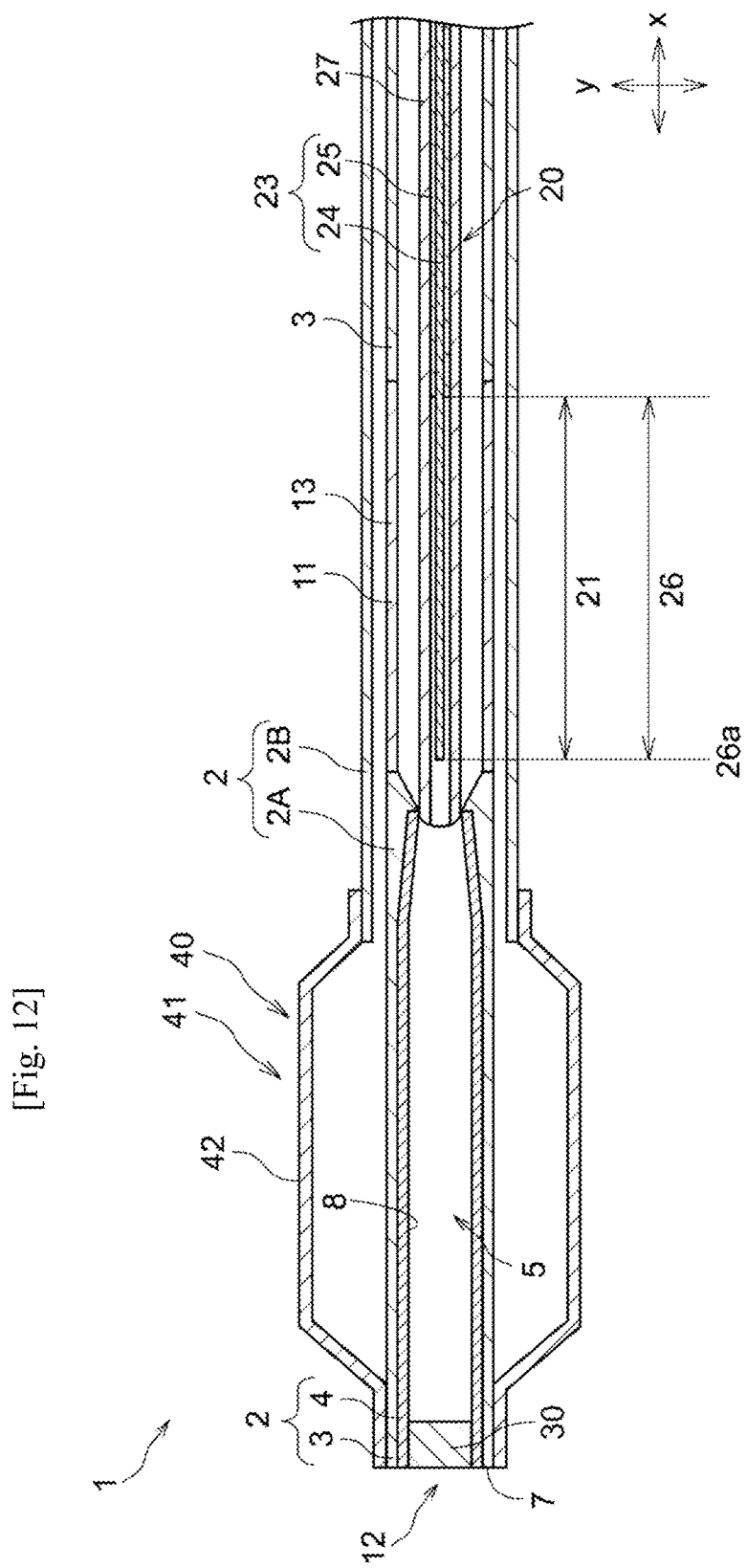
[Fig. 12]

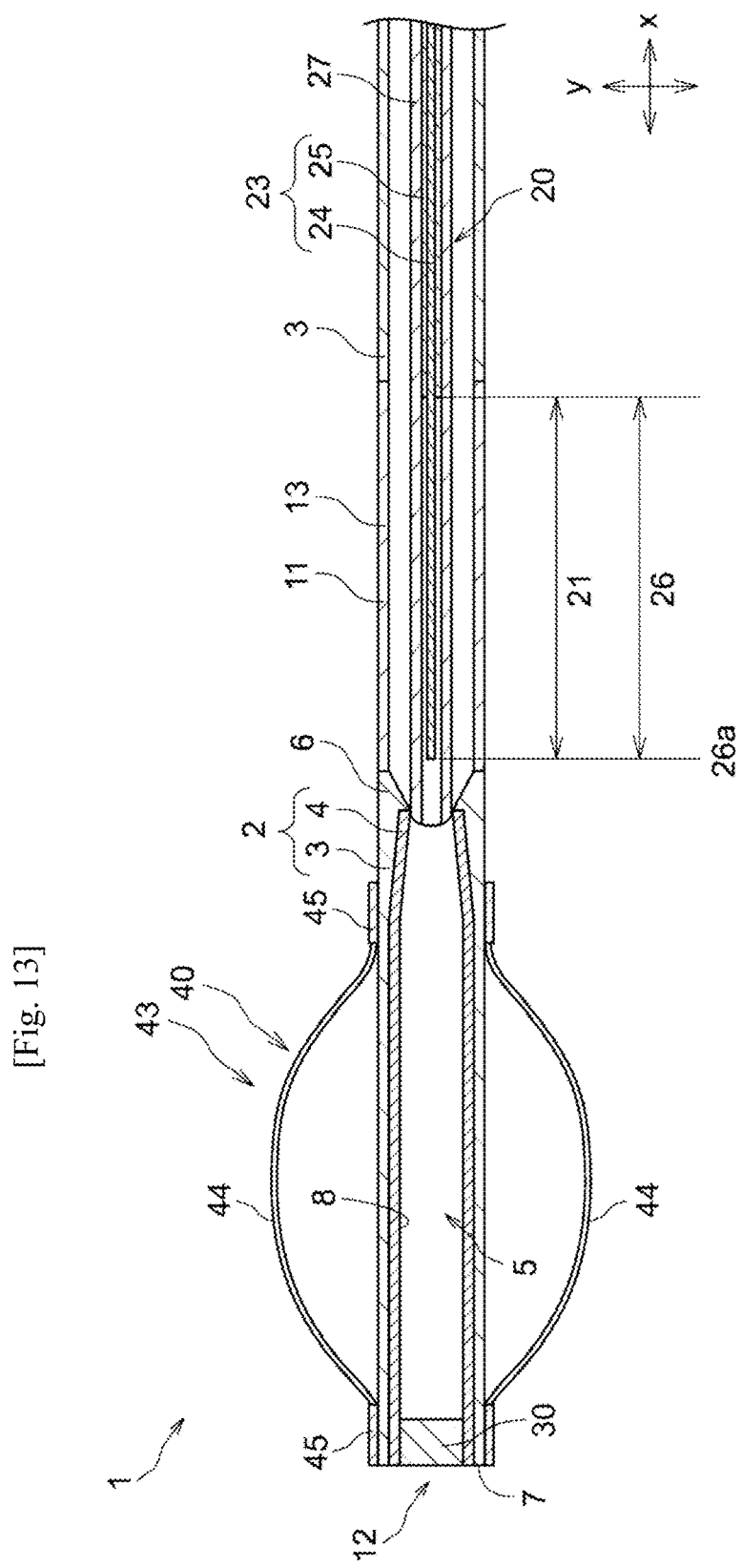
[Fig. 13]

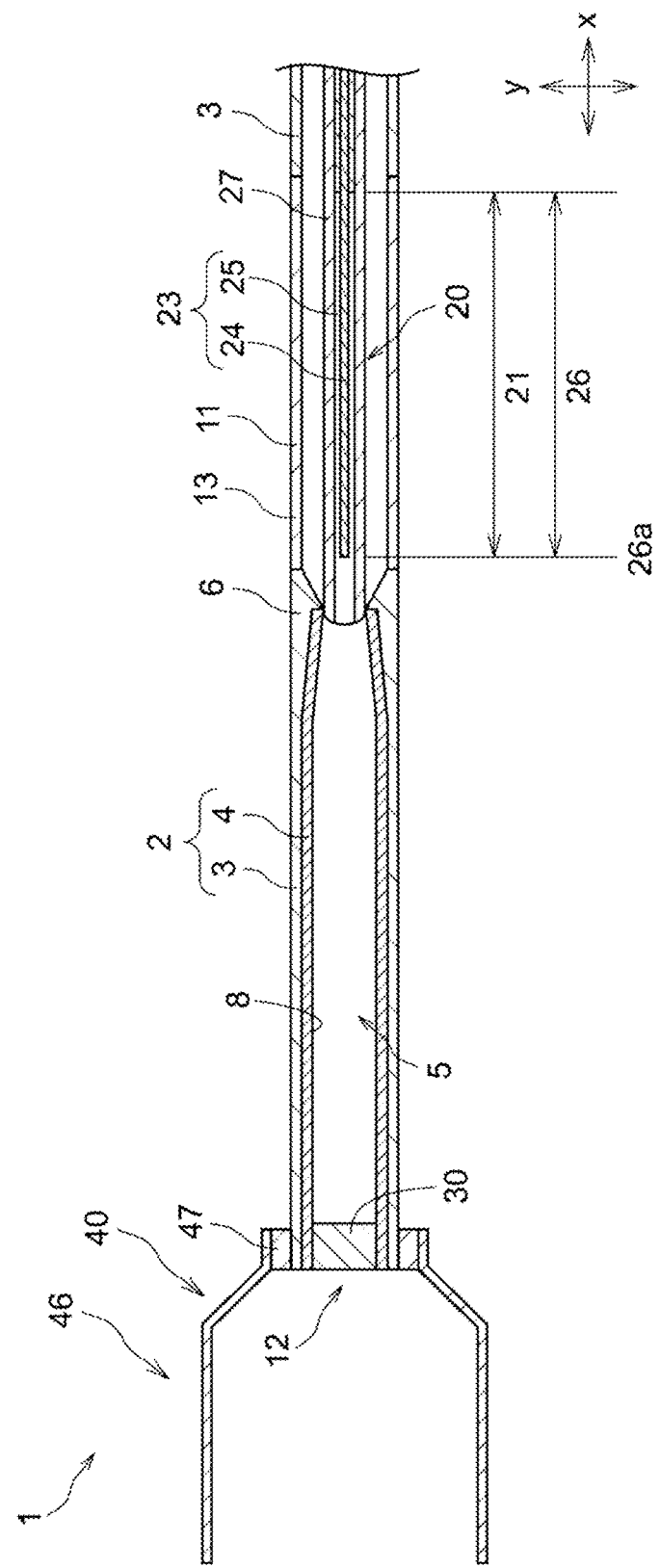
[Fig. 14]

LIGHT IRRADIATION MEDICAL DEVICE

TECHNICAL FIELD

The present invention relates to a light irradiation medical device for irradiating a tissue such as a cancer cell with light in a body lumen such as a blood vessel and a digestive tract.

BACKGROUND ART

In photodynamic therapy (PDT), a photosensitizer is administered into a body by intravenous injection or intraperitoneal administration, is accumulated in a target tissue such as a cancer cell, and is excited by irradiation with light of a specific wavelength. When the excited photosensitizer returns to the ground state, energy conversion occurs, generating reactive oxygen species. The reactive oxygen species attack the target tissue, by which the target tissue can be removed. In ablation using a laser beam, a target tissue is irradiated with a laser beam and cauterized. A device for performing such light irradiation has been proposed.

Patent Document 1 discloses an endoscope system including an insertion part, an illumination light irradiation part, a treatment light irradiation part, and a light receiving part. The insertion part is formed to have a tubular shape that can be inserted into the body cavity of a subject. The treatment light irradiation part is configured to simultaneously irradiate the inside of a substantially tubular region at the side or the front of the end part with treatment light.

Patent Document 2 discloses an optical probe including a cylindrical probe outer cylinder, an optical waveguide member, a first irradiation part, and a second irradiation part. The optical waveguide member guides first light and second light that is arranged in the axial direction of the outer cylinder into the inner space of the probe outer cylinder. When the first light and the second light are simultaneously emitted from the optical waveguide member, the first irradiation part and the second irradiation part irradiate different portions on the irradiation target with the first light and the second light, respectively.

RELATED ART DOCUMENTS

Patent Documents

Patent Document 1: JP-A-2014-104138
Patent Document 2: JP-A-2008-125939

SUMMARY OF THE INVENTION

Technical Problem

As described in Patent Documents 1 and 2, there are light irradiation devices of sideways irradiation type and light irradiation devices of forward irradiation type, and they are selectively used depending on the location and shape of a tumor. However, in an actual procedure, there is a case where it is necessary to switch the irradiation direction, such as the case where the forward irradiation is performed after sideways irradiation. In a case where it is desired to switch the irradiation direction, it is necessary to replace the device each time, and this may increase the time for the procedure and cause a burden on an operator or the patient. In view of this, an object of the present invention is to provide a light irradiation medical device that contributes to an increase in efficiency of a procedure.

Solutions to the Problems

The gist of one embodiment of a light irradiation medical device according to the present invention that can overcome the above problems is as follows. A light irradiation medical device is characterized by including: a shaft having a first end and a second end in a longitudinal direction, the shaft having a lumen extending in the longitudinal direction; and a light guiding device disposed in the lumen of the shaft so as to be movable in the longitudinal direction, wherein the light guiding device extends in the longitudinal direction and has a light diffusion part at a distal part of the light guiding device, the shaft has a first window provided in a peripheral wall of a distal part of the shaft and a second window provided at a distal end face of the shaft, and the shaft has a reflection surface that reflects light emitted from the light guiding device, the reflection surface being disposed distal to the first window and on an inner side of the shaft. According to the light irradiation medical device, the light irradiation direction can be switched by moving the light guiding device in the longitudinal direction of the shaft. This configuration does not need replacement of the device for switching the irradiation direction, and thus, can contribute to an increase in efficiency of a procedure. For example, it is preferable that, when the light guiding device is moved so that the light diffusion part overlaps the first window, light emitted from the light guiding device passes through the first window, and when the light guiding device is moved so that the light diffusion part overlaps the reflection surface, light emitted from the light guiding device passes through the second window.

The first window may be longer than the light diffusion part in the longitudinal direction of the shaft. The first window may be disposed over the entire periphery of the shaft in a circumferential direction. In the first window, a transparent member that transmits light emitted from the light guiding device may be disposed.

The reflection surface may be disposed in a region longer than the light diffusion part in the longitudinal direction of the shaft. The reflection surface may be disposed over the entire periphery of the shaft in the circumferential direction. The shaft may have a reduced diameter part in which an inner diameter of the shaft decreases toward the first window, the reduced diameter part being disposed distal to the first window, and the reflection surface may be disposed at the reduced diameter part. The reflection surface may be disposed in an entire section of the shaft that is located distal to a proximal end point of the reduced diameter part.

The shaft may have a small-diameter part disposed distal to the first window and having an inner diameter smaller than a minimum inner diameter of the shaft in a section in which the first window is located, the small-diameter part being in contact with the light guiding device in a state where the light guiding device is movable in the longitudinal direction of the shaft.

The light irradiation medical device may further include a lens that focuses light emitted from the light guiding device, the lens being disposed at a distal end of the lumen of the shaft. The light guiding device may include a position display part at a proximal end, the position display part indicating a position of the light guiding device with respect to the shaft.

The light irradiation medical device may further include an expandable part at the distal part of the shaft, the expandable part expanding radially outward of the shaft. The expandable part may be a balloon, a basket including a plurality of elastic wires, or a self-expandable stent.

Advantageous Effects of the Invention

According to the light irradiation medical device, the light irradiation direction can be switched by moving the light guiding device in the longitudinal direction of the shaft. This configuration does not need replacement of the device for switching the irradiation direction, and thus, can contribute to an increase in efficiency of a procedure.

BRIEF DESCRIPTION OF THE DRAWINGS

FIG. 1 is a side view of a light irradiation medical device according to an embodiment of the present invention.

FIG. 2 is an enlarged cross-sectional views of a distal side of the light irradiation medical device illustrated in FIG. 1.

FIG. 3 is a cross-sectional view of the light irradiation medical device illustrated in FIG. 2 taken along line III-III.

FIG. 4 is a cross-sectional view of the light irradiation medical device illustrated in FIG. 2 taken along line IV-IV.

FIG. 5 is a cross-sectional view of the light irradiation medical device illustrated in FIG. 2 taken along line V-V.

FIG. 6 is an enlarged cross-sectional views of a distal side of the light irradiation medical device illustrated in FIG. 1.

FIG. 7 is a cross-sectional view illustrating a modification of the light diffusion part illustrated in FIG. 2

FIG. 8 is a side view of a modification of the light irradiation medical device illustrated in FIG. 1.

FIG. 9 is a cross-sectional view illustrating a modification of the shaft illustrated in FIG. 2.

FIG. 10 is a cross-sectional view illustrating a modification of the light irradiation medical device illustrated in FIG. 2.

FIG. 11 is a front view of a valve illustrated in FIG. 10.

FIG. 12 is a cross-sectional view illustrating a modification of the light irradiation medical device illustrated in FIG. 2.

FIG. 13 is a cross-sectional view (partially a side view) illustrating a modification of the light irradiation medical device illustrated in FIG. 2.

FIG. 14 is a cross-sectional view illustrating a modification of the light irradiation medical device illustrated in FIG. 2.

DESCRIPTION OF EMBODIMENTS

The present invention will be specifically explained below based on the following embodiments, however, the present invention is not restricted by the embodiments described below of course, and can be certainly put into practice after appropriate modifications within in a range meeting the gist of the above and the below, all of which are included in the technical scope of the present invention. In the drawings, hatching, a reference sign for a member may be omitted for convenience, and in such a case, the description and other drawings should be referred to. In addition, sizes of various members in the drawings may differ from the actual sizes thereof, since priority is given to understanding the features of the present invention.

An embodiment of the light irradiation medical device according to the present invention is characterized by including: a shaft having a first end and a second end in a longitudinal direction, the shaft having a lumen extending in the longitudinal direction; and a light guiding device disposed in the lumen of the shaft so as to be movable in the longitudinal direction, wherein the light guiding device extends in the longitudinal direction and has a light diffusion part at a distal part of the light guiding device, the shaft has a first window provided in a peripheral wall of a distal part of the shaft and a second window provided at a distal end face of the shaft, and the shaft has a reflection surface that reflects light emitted from the light guiding device, the reflection surface being disposed distal to the first window and on an inner side of the shaft. According to the light irradiation medical device, the light irradiation direction can be switched by moving the light guiding device in the longitudinal direction of the shaft. This configuration does not need replacement of the device for switching the irradiation direction, and thus, can contribute to an increase in efficiency of a procedure.

The light irradiation medical device is used to irradiate a treatment site that is a target tissue such as a cancer cell with light having a specific wavelength in a body lumen such as a blood vessel or a digestive tract in PDT or photoablation. The light irradiation medical device may be delivered alone to the treatment site, or may be used together with a catheter or an endoscope for delivery. In treatment using an endoscope, the light irradiation medical device is placed in the body through a forceps channel of the endoscope and delivered to the treatment site.

A basic configuration of the device will be described with reference to FIGS. 1 to 6. FIG. 1 is a side view of a light irradiation medical device according to an embodiment of the present invention. FIGS. 2 and 6 are enlarged cross-sectional views of a distal side of the light irradiation medical device illustrated in FIG. 1. FIG. 3 is a cross-sectional view of the light irradiation medical device illustrated in FIG. 2 taken along line III-III. FIG. 4 is a cross-sectional view of the light irradiation medical device illustrated in FIG. 2 taken along line IV-IV. FIG. 5 is a cross-sectional view of the light irradiation medical device illustrated in FIG. 2 taken along line V-V. FIG. 2 illustrates a state in which a light guiding device 20 is moved so that a light diffusion part 21 of the light guiding device 20 corresponds to a first window 11, and FIG. 6 illustrates a state in which the light guiding device 20 is moved so that the light diffusion part 21 is located distal to the first window 11. The light irradiation medical device 1 includes a shaft 2 and the light guiding device 20. The light irradiation medical device 1 may be simply referred to as the device 1 below.

In the present invention, the distal side of the device 1 refers to a first end side in a longitudinal direction x of the shaft 2, that is, a treatment object side. The proximal side of the device 1 refers to a second end side in the longitudinal direction x of the shaft 2, that is, the user's hand side. When each member is divided into two equal parts in the longitudinal direction, the proximal side may be referred to as a proximal part, and the distal side may be referred to as a distal part.

The shaft 2 has the longitudinal direction x, a radial direction y, and a circumferential direction p. The shaft 2 has a first end and a second end in the longitudinal direction x, and has a lumen 5 extending in the longitudinal direction x. The first end may correspond to a distal end point of the shaft 2, and the second end may correspond to a proximal end point of the shaft 2. The shaft 2 has a tubular shape in order to place the light guiding device 20 in the lumen 5. The shaft 2 is inserted into the body, and thus, preferably has flexibility. In the radial direction y of the shaft 2, the inward direction refers to a direction toward the center of the longitudinal axis of the shaft 2, and the outward direction refers to a radial direction opposite to the inward direction.

Examples of the shaft 2 include: a hollow body constituted by arranging one or a plurality of wire rods in a predetermined pattern; a member obtained by coating at least one of an inner surface or an outer surface of the hollow body with a resin; a resin tube; and a combination thereof, for example, a member obtained by connecting the above members in the longitudinal direction x. Examples of the hollow body constituted by arranging one or a plurality of wire rods in a predetermined pattern include a cylindrical body having a web structure in which the wire rods simply cross each other or the wire rods are interweaved, and a coil around which the wire rods are wound. As the wire rod, one or a plurality of single wires may be used, or one or a plurality of stranded wires may be used. The resin tube can be manufactured by, for example, extrusion molding. When the shaft 2 is a resin tube, the shaft 2 can be composed of a single layer or a plurality of layers. The shaft 2 may be configured such that a part in the longitudinal direction x or in the circumferential direction p is composed of a single layer, and another part is composed of a plurality of layers. For example, as illustrated in FIGS. 2 and 5, the shaft 2 may include a long tubular main body 3 and a reflection member 4 disposed inside the main body 3. As illustrated in FIG. 1, a handle 10 gripped by an operator is preferably connected to the proximal part of the shaft 2. The device 1 may be incorporated into an endoscope or may be used as a combined device.

The shaft 2 can be made of, for example, a synthetic resin, such as a polyolefin resin (for example, polyethylene or polypropylene), a polyamide resin (for example, nylon), a polyester resin (for example, PET), an aromatic polyether ketone resin (for example, PEEK), a polyether polyamide resin, a polyurethane resin, a polyimide resin, and a fluor resin (for example, PTFE, PFA, or ETFE), or metal such as stainless steel, carbon steel, or a nickel-titanium alloy. Only one kind of them may be used singly, or two or more kinds of them may be used in combination. The main body 3 of the shaft 2 is preferably made of any of the synthetic resins described above.

As illustrated in FIG. 2, the first window 11 is provided in a peripheral wall 6 of the distal part of the shaft 2. A second window 12 is provided at a distal end face 7 of the shaft 2. The shaft 2 has a reflection surface 8 that reflects light emitted from the light guiding device 20, the reflection surface 8 being disposed distal to the first window 11 and on an inner side of the shaft 2. According to the device 1, the light irradiation direction of the light 50 can be switched by moving the light guiding device 20 in the longitudinal direction x. This configuration does not need replacement of the device for switching the irradiation direction, and thus, can contribute to an increase in efficiency of a procedure.

When the light guiding device 20 is moved so that the light diffusion part 21 overlaps the first window 11 as illustrated in FIG. 2, the light 50 emitted from the light guiding device 20 may pass through the first window 11. Thus, the light 50 can be emitted sideways through the first window 11. When the light guiding device 20 is moved so that the light diffusion part 21 overlaps the reflection surface 8 as illustrated in FIG. 6, the light 50 emitted from the light guiding device 20 may pass through the second window 12. Thus, the light 50 can be emitted forward, that is, in the distal direction, through the second window 12.

For sideways irradiation, it is preferable to move the light guiding device 20 so that the light diffusion part 21 and the first window 11 overlap at least partially in the longitudinal direction x. For forward irradiation, it is preferable to move the light guiding device 20 so that the distal end point of the light diffusion part 21 is located distal to the proximal end point of the reflection surface 8, and it is more preferable to move the light guiding device 20 so that the proximal end point of the light diffusion part 21 is located distal to the proximal end point of the reflection surface 8.

The light guiding device 20 is disposed in the lumen 5 of the shaft 2 and is movable in the longitudinal direction x. The light guiding device 20 extends in the longitudinal direction x and has the light diffusion part 21 at the distal part thereof. A connector 22 provided at the proximal end of the light guiding device 20 is connected to a light source such as a semiconductor laser.

It is only sufficient that a first light beam for treatment is emitted from the light guiding device 20. Besides the first light beam, a second light beam for targeting may be emitted.

The first light beam is preferably a laser beam that irradiates a body tissue and has a wavelength suitable for light treatment such as PDT or PIT. The wavelength of the first light beam may be, for example, 0.64 µm or more, 0.65 µm or more, or 0.66 µm or more, and may be 0.72 µm or less, 0.71 µm or less, or 0.7 µm or less.

The second light beam is a light beam emitted to recognize the treatment site before the emission of the first light beam, and preferably has lower radiation energy than the first light beam. The second light beam preferably has higher relative luminosity than the first light beam, and the wavelength of the second light beam preferably ranges from 0.55 µm to 0.56 µm, for example.

The first light beam and the second light beam may be emitted from one light source, and the first light beam and the second light beam may be emitted from different light sources.

In FIG. 2, the light guiding device 20 has an optical fiber 23 extending in the longitudinal direction x. The optical fiber 23 is a transmission path for transmitting an optical signal to a target tissue. In FIG. 2, the optical fiber 23 has a core 24 and a cladding 25 covering the core 24 from outside in the radial direction, and has a cladding absent part 26 in a part of the distal part of the core 24. The cladding absent part 26 may be simply referred to as a part 26. The part 26 is an area where there is no cladding 25 in at least a part of the core 24 in the circumferential direction, but the cladding 25 may be absent on the entire periphery of the core 24 in the circumferential direction. In FIG. 2, the part 26 is a light emitting area and functions as the light diffusion part 21. Due to the formation of the part 26, light can be emitted sideways through the first window 11.

A material constituting the core 24 and the cladding 25 is not particularly limited, and plastics and glass such as quartz glass or fluoride glass can be used.

The part 26 is preferably provided in a portion including a distal end point 24a of the core 24 in the longitudinal direction x. This facilitates the formation of the part 26 and also increases flexibility at the distal end of the light guiding device 20.

As illustrated in FIG. 2, the location of a distal end point 26a of the part 26 is preferably coincident with the location of the distal end point 24a of the core 24. This eliminates the need for a difficult step of forming the part 26 while leaving the cladding 25 of the portion of the optical fiber 23 including the distal end point, so that a step of forming the light emitting area of the optical fiber 23 can be facilitated.

The part 26 can be formed by removing the cladding 25 by etching or polishing. In order to improve light diffusion properties, irregularities may be provided at the surface of the part 26. The irregularities can be formed by mechanically or chemically roughening the surface of the part 26.

Examples of the method for roughening the surface include a method using etching, blasting, a scriber, wire brushing, or sandpaper.

FIG. 7 is a cross-sectional view illustrating a modification of the light guiding device 20 illustrated in FIG. 2. As illustrated in FIG. 7, the light guiding device 20 may include the optical fiber 23, and a diffusion member 28 may be connected to the end face of the optical fiber 23. The diffusion member 28 only needs to diffuse light emitted from the optical fiber 23 at least in the radial direction y of the shaft 2. The shape of the diffusion member 28 is not particularly limited, but may be, for example, a columnar shape.

Although not illustrated, the diffusion member 28 may be disposed so as to cover the cladding absent part 26. In that case, the diffusion member 28 preferably has a ring shape or a coil shape.

As the diffusion member 28, glass such as quartz glass or resin can be used, for example. The diffusion member 28 made of resin can be obtained by dispersing a diffusing agent in a light-transmissive resin. Examples of the light-transmissive resin include a (meth) acrylic resin (for example, polymethyl methacrylate (PMMA)), a polycarbonate resin (for example, polydiethylene glycol-bis-allyl carbonate (PC)), a polystyrene-based resin (for example, a methyl methacrylate styrene copolymer resin (MS) and an acrylonitrile styrene resin (SAN)), a polyamide resin (for example, nylon), and a polyolefin resin. Examples of the diffusing agent include inorganic particles such as titanium oxide, barium sulfate, and calcium carbonate, and organic particles such as crosslinked acrylic particles and crosslinked styrene particles.

Although FIGS. 2 and 7 illustrate an example in which the light guiding device 20 includes one single-core fiber having one core 24 disposed in one cladding 25, the light guiding device 20 may include a plurality of single-core fibers. The light guiding device 20 may include one or a plurality of multicore fibers in which a plurality of cores 24 is disposed in one cladding.

The light guiding device 20 preferably does not rotate about the longitudinal axis of the shaft 2 with respect to the shaft 2. This configuration eliminates the need to rotate the light guiding device 20 during adjustment of the light irradiation position, whereby damage to the light guiding device 20 can be prevented.

When the light guiding device 20 includes the optical fiber 23 as illustrated in FIG. 2, the light guiding device 20 preferably includes a protective tube 27 that covers the optical fiber 23 and has optical transparency. Due to the protective tube 27, the optical fiber 23 can be reinforced, the light diffusion properties can be improved, and uneven irradiation can be reduced.

The protective tube 27 extends in the longitudinal direction of the optical fiber 23. It is preferable that the protective tube 27 entirely covers the optical fiber 23 in the longitudinal direction. Thus, damage, deformation, and breakage of the core 24 can be suppressed in the entire optical fiber 23. For the same reason, it is preferable that the protective tube 27 entirely covers the optical fiber 23 in the circumferential direction. A distal end point 27a of the protective tube 27 is preferably located distal to the distal end point of the optical fiber 23, and more preferably located distal to the distal end point 24a of the core 24. It is preferable that the part 26 is covered with the protective tube 27, and it is more preferable that the part 26 is entirely covered with the protective tube 27.

The protective tube 27 only needs to have optical transparency. The protective tube 27 is preferably made of resin. Examples of the resin constituting the protective tube 27 include polyamide resin, polyester resin, polyurethane resin, polyolefin resin, fluorine resin, vinyl chloride resin, silicone resin, and natural rubber. These resins may be used alone, or two or more of them may be used in combination. Among them, polyamide resin, polyester resin, polyurethane resin, polyolefin resin, and fluorine resin are preferably used.

A material having light diffusion properties can be added to the resin constituting the protective tube 27. Examples of the material include inorganic particles such as titanium oxide, barium sulfate, and calcium carbonate, and organic particles such as crosslinked acrylic particles and crosslinked styrene particles. Light from the light diffusion part 21 can be further diffused.

FIG. 8 is a side view of a modification of the light irradiation medical device illustrated in FIG. 1. As illustrated in FIG. 8, the light guiding device 20 preferably includes a position display part 29 at a proximal end thereof, the position display part 29 indicating a position of the light guiding device 20 with respect to the shaft 2. The position of the light diffusion part 21 can be easily recognized using the position display part 29, whereby a site to be treated such as a lesion can be reliably irradiated with light.

As the position display part 29, a scale, a character, a number, a symbol, a figure, or the like can be used. The position display part 29 may be a protrusion or a recess provided at the surface of the light guiding device 20 or the handle 10. The scale may be a combination of an axis extending along the longitudinal direction or the circumferential direction of the light guiding device 20 and at least one of a straight line, a curve, an oblique line, or a point intersecting the axis. Only one position display part 29 may be provided, or a plurality of position display parts 29 may be provided.

The position display part 29 may be a colored portion of the outer surface of the light guiding device 20 or a portion in which a dye such as a pigment is mixed with a material constituting the light guiding device 20.

One or a plurality of first windows 11 can be provided for one shaft 2. In order to facilitate adjustment of the irradiation position, it is preferable that only one first window 11 is provided for one shaft 2.

The first window 11 is preferably disposed proximal to a distal end point 2a of the shaft 2. For example, a distal end point 11a of the first window 11 may be located within a range of 10 cm from the distal end point 2a.

The length of the first window 11 in the longitudinal direction x is not particularly limited, but the first window 11 is preferably longer than the light diffusion part 21. Thus, a wide range in the longitudinal direction x can be irradiated at a time through the first window 11.

The first window 11 may be provided only in a part of the shaft 2 in the circumferential direction p, but is preferably provided in more than or equal to half of the shaft 2 in the circumferential direction p, and more preferably provided in the entire periphery of the shaft 2 in the circumferential direction p. A wide range in the circumferential direction p can be irradiated at a time, whereby the procedure time can be shortened.

The first window 11 is preferably longer than the light diffusion part 21 in the circumferential direction p. Thus, a wide range in the circumferential direction p can be irradiated at a time through the first window 11. Note that the first window 11 is preferably longer than the part 26 in the circumferential direction p. That is, in a case where the light diffusion part 21 is provided in a region less than the entire periphery in the circumferential direction p, it is preferable that the first window 11 is provided in a region with a length equal to or longer than the length of the light diffusion part 21 in the circumferential direction p, or is provided at the entire periphery.

The second window 12 is only required to be provided at the distal end face 7 of the shaft 2. The second window 12 can also be said to be an opening at the distal end point 2a of the shaft 2. The second window 12 preferably extends in the radial direction y of the shaft 2. The second window 12 is preferably not disposed in the peripheral wall 6. Although a plurality of second windows 12 may be disposed for one shaft 2, it is preferable that only one second window 12 is disposed.

The first window 11 and the second window 12 are preferably made of a material having higher light permeability than a portion of the shaft 2 where these windows are not provided. Examples of such a structure include a mode in which a window is opened and a mode in which a transparent member is disposed in the window. Here, opening the window means that no other member is disposed in the window.

The first window 11 may be opened, and the inside and the outside of the shaft 2 may communicate with each other by the first window 11. The light diffusion part 21 can be exposed from the first window 11 when the light guiding device 20 is moved, and thus, it is easy to directly irradiate the lesion with light.

A transparent member (a first transparent member 13 below) that transmits light emitted from the light guiding device 20 is preferably disposed in the first window 11. The first transparent member 13 can enhance the effect of preventing intrusion of liquid into the shaft 2. Light can be easily diffused appropriately by adjusting the constituent material of the first transparent member 13. The first transparent member 13 is preferably disposed entirely within the first window 11.

In FIGS. 2 and 4, the first transparent member 13 extends in the planar direction of the peripheral wall 6. The first transparent member 13 may be a curved thin plate-shaped member or a tubular member.

In FIGS. 1 and 2, the first transparent member 13 is disposed in the first window 11, and the second window 12 is opened. Although not illustrated, a second transparent member that transmits light from the light guiding device 20 may be disposed in the second window 12. The second transparent member may be disposed in the lumen 5 of the shaft 2. The second transparent member is preferably disposed entirely within the second window 12. As a result, the distal end point 2a of the shaft 2 is preferably closed. This configuration can further enhance the effect of preventing intrusion of liquid into the shaft 2.

The second transparent member preferably extends in the radial direction y of the shaft 2. The second transparent member may have, for example, a thin flat plate shape. The distal end face or the proximal end face of the second transparent member may be flat or curved.

Examples of a material constituting the first transparent member 13 or the second transparent member include a synthetic resin such as (meth) acrylic resin (for example, polymethyl methacrylate (PMMA)), a polycarbonate resin (for example, polydiethylene glycol-bis-allyl carbonate (PC)), a polystyrene-based resin (for example, a methyl methacrylate styrene copolymer resin (MS) and an acrylonitrile styrene resin (SAN)), a polyamide resin (for example, nylon), and a polyolefin resin. The above materials may be used singly, or two or more kinds of the materials may be used in combination. The constituent materials of the first transparent member 13 and the second transparent member may be the same or different from each other.

As illustrated in FIG. 2, the shaft 2 has the reflection surface 8. The reflection surface 8 reflects light from the light diffusion part 21, so that forward irradiation can be efficiently performed through the second window 12. FIGS. 2 and 5 illustrate an example in which the shaft 2 includes the main body 3 that is the long tubular main body 3 and is provided with the first window 11, and the cylindrical reflection member 4 disposed inside the main body 3, and the inner surface of the reflection member 4 is the reflection surface 8.

The reflection surface 8 may be a surface of a reflection layer laminated on the inner surface of the main body 3. The reflection layer may be formed, for example, by applying a coating agent containing a reflection material to the inner surface of the main body 3. The reflection layer may be formed by applying a reflection material to the inner surface of the shaft 2 by a method such as vapor deposition, sputtering, electroplating, or chemical plating. The reflection layer may be a metal thin film. Examples of the reflection material include aluminum, gold, silver, copper, tin, titanium dioxide, tantalum pentoxide, aluminum oxide, silicon dioxide, magnesium fluoride, or a combination thereof. The above-described reflection member 4 may also be made of a material containing the reflection material.

As illustrated in FIG. 5, the reflection surface 8 is preferably disposed at the entire shaft 2 in the circumferential direction p. Light from the light guiding device 20 is easily reflected forward without leaking.

The reflection surface 8 is preferably disposed in a region longer than the light diffusion part 21 in the longitudinal direction x as illustrated in FIG. 6. It is more preferable that the reflection surface 8 is disposed in a region longer than the part 26 in the longitudinal direction x. Light from the light guiding device 20 is easily reflected forward without leaking. Note that the reflection surface 8 may be disposed in a region longer than the first window 11 in the longitudinal direction x.

At least a part of the reflection surface 8 may be inclined with respect to the optical axis of the optical fiber 23. The inclination angle of the reflection surface 8 with respect to the optical axis of the optical fiber 23 may be 3 degrees or more, 5 degrees or more, or 10 degrees or more, or may be 30 degrees or less, 25 degrees or less, or 15 degrees or less. By setting the inclination angle in this manner, light is easily reflected forward by the reflection surface 8.

FIG. 9 is a cross-sectional view illustrating a modification of the shaft 2 illustrated in FIG. 2. As illustrated in FIG. 9, the light irradiation medical device preferably includes a lens 30 that focuses light emitted from the light guiding device 20, the lens 30 being disposed at the distal end of the lumen 5 of the shaft 2. Due to the lens 30, light from the light guiding device 20 is easily emitted forward. One or a plurality of lenses may be provided.

As the lens 30, a condensing lens such as a gradient index lens (GRIN lens) can be used. In addition, an aberration correction lens may be used as the lens 30. Aberration generated by reflection of the emitted light by the reflection surface 8 can be corrected, and thus, when the emitted light is a light beam for observation, the emitted light is easily focused, whereby a region in front of the shaft 2 is easily observed. Examples of the aberration correction lens include a doublet lens obtained by combining a convex lens and a concave lens, and an aspherical lens.

The lens 30 is preferably disposed distal to the first window 11, and the lens 30 is more preferably disposed in the second window 12. In the longitudinal direction x, the lens 30 may be disposed at a position where the reflection surface 8 is located or may be disposed distal to the reflection surface 8.

As illustrated in FIG. 2, it is preferable that the shaft 2 has a reduced diameter part 14 in which an inner diameter of the shaft 2 decreases toward the first window 11, the reduced diameter part 14 being disposed distal to the first window 11, and the reflection surface 8 is disposed at the reduced diameter part 14. At least a part of the reflection surface 8 is inclined with respect to the longitudinal direction x, whereby the reflection surface 8 is easily directed to the second window 12. As a result, light from the light diffusion part 21 is easily emitted forward through the second window 12.

In the reduced diameter part 14, the inner diameter of the shaft 2 may decrease toward the first window 11 in a tapered manner as illustrated in FIG. 2. In that case, the reflection surface 8 is preferably inclined with respect to the direction in which the light diffusion part 21 extends. As another mode, a step may be provided at the inner surface of the shaft 2, and the inner diameter of the shaft 2 may gradually decrease toward the first window 11. As illustrated in FIG. 9, the inner diameter of the shaft 2 may be reduced exponentially in the reduced diameter part 14. As illustrated in FIG. 9, the inner diameter of the shaft 2 can be exponentially reduced by using the reflection member 4 having a dome shape at the proximal end.

The reflection surface 8 is preferably disposed in an entire section of the shaft 2 that is located distal to a proximal end point 14b of the reduced diameter part 14. Due to the configuration in which the reflection surface 8 is located as described above, light from the light diffusion part 21 is easily emitted forward through the second window 12.

FIG. 10 is a cross-sectional view illustrating a modification of the device 1 illustrated in FIG. 2, and FIG. 11 is a front view of a valve 16 illustrated in FIG. 10. As illustrated in FIG. 10, the shaft 2 may have a small-diameter part 15 disposed distal to the first window 11 and having an inner diameter smaller than the minimum inner diameter of the shaft 2 in a section in which the first window 11 is located, the small-diameter part 15 being in contact with the light guiding device 20 in a state where the light guiding device 20 is movable in the longitudinal direction x. Light is easily confined in the space distal to the small-diameter part 15, whereby an amount of light emitted from the second window 12 can be increased.

As illustrated in FIG. 2, the small-diameter part 15 may be formed by the peripheral wall 6 of the shaft 2 protruding inward in the radial direction y. As another mode, a component for reducing the inner diameter of the shaft 2 may be provided in the lumen 5 of the shaft 2. The component for forming the small-diameter part 15 is preferably elastically deformable. Even if the light guiding device 20 is moved, the small-diameter part 15 is elastically deformed, so that the small-diameter part 15 can be kept in close contact with the light guiding device 20. In FIG. 10, the valve 16 is provided in the lumen 5 of the shaft 2. As illustrated in FIG. 11, an opening 17 through which the light guiding device 20 can be inserted is provided in the central part of the valve 16.

The mode of forming the small-diameter part 15 is not limited to the valve 16, and a seal member may be provided in the lumen 5 of the shaft 2. As a result, the sealability between the light guiding device 20 and the shaft 2 can be enhanced. The seal member preferably has a ring shape. The seal member may be a round ring (in other words, an O-ring) having a circular or oval cross section, a square ring having a polygonal cross section, or a ring having a combination of circular, oval, and polygonal cross sections.

As still another mode, a nut part may be provided distal to the first window 11 of the shaft 2, and a bolt part to be fitted to the nut part may be provided proximal to the light diffusion part 21 of the light guiding device 20. In this case, the nut part functions as the small-diameter part 15. The outer diameter of the light guiding device 20 at the side distal to the bolt part is preferably smaller than that of the bolt part. As a result, the portion at the side distal to the bolt part can be easily inserted into the section distal to the small-diameter part 15.

The small-diameter part 15 has a surface 18 facing the distal end point 2a of the shaft 2, and the reflection member 4 or the reflection layer may be disposed at the surface 18. Light from the light diffusion part 21 is easily emitted forward through the second window 12.

Preferably, the small-diameter part 15 is in contact with the light guiding device 20 when the light guiding device 20 is moved so that the light diffusion part 21 overlaps the first window 11. In this case, it is more preferable that the distal end point of the light guiding device 20 is located distal to the small-diameter part 15. The position of the light guiding device 20 in the shaft 2 can be fixed during sideways irradiation.

FIG. 12 is a cross-sectional view illustrating a modification of the device 1 illustrated in FIG. 2, FIG. 13 is a cross-sectional view (partially a side view) illustrating a modification of the device 1 illustrated in FIG. 2, and FIG. 14 is a cross-sectional view illustrating a modification of the device 1 illustrated in FIG. 2. As illustrated in FIGS. 12 to 14, the light irradiation medical device may further include an expandable part 40 at the distal part of the shaft 2, the expandable part 40 expanding outward in the radial direction y of the shaft 2. The device 1 is easily fixed in the body by expanding the expandable part 40.

The expandable part 40 is preferably a balloon, a basket with a plurality of elastic wires, or a stent, and the expandable part 40 is more preferably a balloon 41 (FIG. 12), a basket 43 with a plurality of elastic wires (FIG. 13), or a self-expandable stent 46 (FIG. 14). If the expandable part 40 is the balloon 41, the outer surface of the balloon 41 comes into contact with a wall of the lumen in the body such as a blood vessel and a digestive tract when the balloon 41 is expanded, by which the shaft 2 can be fixed in the body. When the expandable part 40 is a basket or a stent, a wire rod constituting the basket or the stent easily bites into the wall of the lumen in the body, so that the device 1 can be firmly fixed in the body. Among the stents, the self-expandable stent does not need to have a balloon inside, so that the diameter in a compressed state can be smaller than that of the balloon expandable stent. Note that the outer shape of the self-expandable stent 46 is schematically illustrated in FIG. 14.

The expandable part 40 may be disposed distal to the first window 11 or proximal to the first window 11. The expandable part 40 may be longer than the light diffusion part 21 in the longitudinal direction x. Further, the expandable part 40 may be disposed so as to overlap the first window 11. In that case, the expandable part 40 may be longer than the first window 11 in the longitudinal direction x.

In FIG. 12, the shaft 2 includes an inner tube 2A and an outer tube 2B. The reflection member 4 is provided inside the inner tube 2A. A fluid feeder (not illustrated) is connected to the proximal part of the shaft 2. The light guiding device 20 is inserted into the lumen of the inner tube 2A. A space between the inner tube 2A and the outer tube 2B communicates with the inside of the balloon 41 and functions as a flow path of a pressure fluid.

The balloon 41 may be disposed so as to cover the first window 11. The first window 11 may be longer than a straight tube part 42 of the balloon 41 in the longitudinal direction x. When the balloon 41 covers the first window 11, it is preferable that a gas such as air, nitrogen, or carbon dioxide is supplied into the balloon 41 from the viewpoint of optical transparency. The balloon 41 preferably contains a light transmissive material. The balloon 41 may contain a light diffusing material.

In the basket 43, a plurality of elastic wires 44 are bundled at the distal side and the proximal side, respectively. In FIG. 13, the distal end and the proximal end of the elastic wire 44 are fixed to the shaft 2 by a tubular connecting member 45. The elastic wire 44 may be bent or spirally twisted between the two bundled portions. The elastic wire 44 is preferably made of a shape memory alloy or a shape memory resin. The elastic wire 44 may be a single wire or a stranded metal wire.

The stent is an expandable structure constituted by a net-like structure such as a mesh, and includes a plurality of struts. The stent may be formed from a pattern of interconnected structural elements that expand and contract circumferentially and axially, for example.

The proximal end of the self-expandable stent 46 is preferably fixed to the distal end of the shaft 2. The device 1 can be fixed in the body in a state where the stent does not inhibit light emission. When the expandable part 40 is a self-expandable stent 46 and the distal end is more expandable than the proximal end, the distal end is preferably not secured to the distal end of the shaft 2. The shaft 2 can be fixed in the body by bringing the distal end of the stent into contact with the wall of the tube in the body. In FIG. 14, a cylindrical support part 47 for fixing the expandable part 40 to the shaft 2 is disposed outside the shaft 2.

When the expandable part 40 is a basket or a stent, the device 1 preferably further includes a third tubular member capable of accommodating the expandable part 40 in the lumen. As a result, it is possible to prevent a forceps port, the inside of a forceps channel, the body tissue, and the like from being damaged by expansion of the basket or the stent before the device 1 is delivered to the vicinity of the treatment site.

This application claims the benefit of the priority date of Japanese patent application No. 2020-204324 filed on Dec. 9, 2020. All of the contents of the Japanese patent application No. 2020-204324 filed on Dec. 9, 2020 are incorporated by reference herein.

REFERENCE SIGNS LIST

1: Light irradiation medical device
2: Shaft
3: Main body
4: Reflection member
5: Lumen
6: Peripheral wall
7: Distal end face
8: Reflection surface
10: Handle
11: First window
12: Second window
13: First transparent member
14: Reduced diameter part
15: Small-diameter part
16: Valve
17: Opening
18: Surface
20: Light guiding device
21: Light diffusion part
22: Connector
23: Optical fiber
24: Core
25: Cladding
26: Cladding absent part
27: Protective tube
28: Diffusion member
29: Position display part
30: Lens
40: Expandable part
41: Balloon
42: Straight tube part
43: Basket
44: Elastic wire
45: Connecting member
46: Self-expandable stent
47: Support part
50: Light
x: Longitudinal direction of the shaft
y: Radial direction of the shaft
p: Circumferential direction of the shaft

The invention claimed is:

1. A light irradiation medical device comprising:
a shaft having a first end and a second end in a longitudinal direction, the shaft having a lumen extending in the longitudinal direction; and
a light guiding device disposed in the lumen of the shaft so that the light guiding device is movable in the lumen of the shaft in the longitudinal direction, wherein
the light guiding device extends in the longitudinal direction and has a light diffusion part at a distal part of the light guiding device,
the shaft has a first window provided in a peripheral wall of a distal part of the shaft and a second window provided at a distal end face of the shaft, and
the shaft has a reflection surface that reflects light emitted from the light guiding device, the reflection surface being disposed distal to the first window and on an inner side of the shaft.

2. The light irradiation medical device according to claim 1, wherein
the light guiding device and the shaft are configured so that the light emitted from the light guiding device passes through the first window when the light diffusion part overlaps with the first window, and the light emitted from the light guiding device passes through the second window when the light diffusion part overlaps with the reflection surface.

3. The light irradiation medical device according to claim 1, wherein the first window is longer than the light diffusion part in the longitudinal direction.

4. The light irradiation medical device according to claim 1, wherein the first window is disposed over an entire periphery of the shaft in a circumferential direction.

5. The light irradiation medical device according to claim 1, wherein in the first window, a transparent member that transmits light emitted from the light guiding device is disposed.

6. The light irradiation medical device according to claim 1, wherein the reflection surface is disposed in a region longer than the light diffusion part in the longitudinal direction.

7. The light irradiation medical device according to claim 1, wherein the reflection surface is disposed over an entire periphery of the lumen of the shaft in a circumferential direction.

8. The light irradiation medical device according to claim 1, wherein the shaft has a reduced diameter part disposed distal to the first window, in the reduced diameter part, an inner diameter of the shaft decreases toward the first window, and the reflection surface is disposed at the reduced diameter part.

9. The light irradiation medical device according to claim 8, wherein the reflection surface is disposed in an entire section of the lumen of the shaft that is located distal to a proximal end point of the reduced diameter part.

10. The light irradiation medical device according to claim 1, wherein the shaft has a small-diameter part disposed distal to the first window and having an inner diameter smaller than a minimum inner diameter of the shaft in a section in which the first window is located, and the shaft and the light guiding device are configured so that the small-diameter part is in contact with the light guiding device and the light guiding device is movable in the lumen of the shaft in the longitudinal direction.

11. The light irradiation medical device according to claim 1, further comprising a lens that focuses light emitted from the light guiding device, the lens being disposed at a distal end of the lumen of the shaft.

12. The light irradiation medical device according to claim 1, further comprising an expandable part at the distal part of the shaft, the expandable part being configured to be expandable radially outward of the shaft.

13. The light irradiation medical device according to claim 12, wherein the expandable part is a balloon, a basket including a plurality of elastic wires, or a self-expandable stent.

14. The light irradiation medical device according to claim 1, wherein the light guiding device includes a position display part at a proximal end, so that the position display part indicates a position of the light guiding device with respect to the shaft.

* * * * *